Patented Nov. 6, 1934

1,979,559

UNITED STATES PATENT OFFICE 1,979,559

ESTER OF HYDROXYBENZOIC ACID

Lucas P. Kyrides, Webster Groves, Mo., assignor, by mesne assignments, to Monsanto Chemical Company, a corporation of Delaware No Drawing. Application June 6, 1932, Serial No. 615,770

7 Claims. (Cl. 260—103)

This invention relates to a novel class of organic compositions characterized in that they are dicarboxylic acid esters of aryl, aralkyl, or alkyl hydroxybenzoates which upon complete hydrolysis with alkalis yield salts of the dicarboxylic acid and the hydroxybenzoic acid and the aralkyl, alkyl alcohol or a phenol corresponding to the aryl group.

The structure of one group of compounds contemplated by the present invention may be represented graphically by the formula:

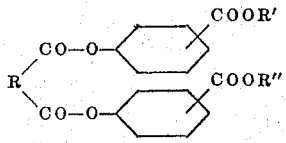

where R represents an aliphatic or aromatic nucleus of a dicarboxylic acid such as maleic acid, succinic acid, phthalic acid, chlorphthalic acid, adipic, etc., and where R' represents hydrogen or an alkyl, aryl or aralkyl group and R'' represents an alkyl, aryl or aralkyl group. The carboxyl group of the hydrobenzoate may be attached in an ortho, meta or para position with respect to the hydroxyl group. For most purposes the ortho configuration is preferred by reason of its relatively lower cost.

Another embodiment of the invention contemplates compounds in which one of the hydroxybenzoate groups in the above formula is substituted by an alkyl, aralkyl or phenyl radical.

One convenient way of preparing the compositions contemplated by the present invention involves reacting the acid chloride of the dicarboxylic acid with the alkyl ester of a hydroxybenzoic acid whereby hydrogen chloride is evolved and the ester is formed. If desired one may employ a Schotten-Baumann reaction.

The di (methyl salicylate) ester of phthalic acid or stated otherwise phthaloyl di (methyl salicylate) probably having the structure:

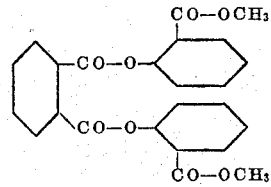

may be prepared by refluxing approximately 2 mols of methyl salicylate with one mol of phthaloyl chloride using benzene as a solvent. The reaction is allowed to proceed until 2 mols of hydrogen chloride are evolved. The addition of a small quantity of zinc chloride accelerates the hydrogen chloride evolution; for this purpose .5% by weight based on the phthaloyl chloride will suffice. After 8-10 hours the product may be recovered by washing the mixture with an aqueous sodium carbonate solution and subsequently evaporating the benzene solvent. The product, which upon crystallization from alcohol forms colorless needles, is odorless and tasteless, practically insoluble in cold water, readily soluble in hot benzol, chloroform and ether and melts at approximately 116° C. The acid chloride which is employed may be made by any convenient method and may consist of the symmetrical form or the asymmetrical form or a mixture thereof. In this connection it is to be noted that phthaloyl chloride, for example, exists in two tautomeric forms which are in equilibrium with each other.

If desired the reaction may be effected in the presence of other solvents such, for example, as chlor benzene. If chlor benzene is employed the condensation proceeds readily without the addition of zinc chloride probably by reason of its higher reflux temperature.

By substituting other polybasic acid chlorides for phthaloyl chloride in the above example the corresponding methyl salicylate ester is formed. The following compounds typify the present invention: succinyl di (ethyl salicylate), succinyl di (methyl salicylate), phthaloyl di (ethyl salicylate), chlorphthaloyl di (ethyl salicylate), phthaloyl di (para hydroxyethyl benzoate), succinyl di (meta hydroxymethyl benzoate) and adipyl di (alkyl hydroxybenzoate). These are made by proceeding in a manner analogous to that described above. Obviously in lieu of the ethyl and methyl groups other alkyl groups such as the propyl and butyl groups may be introduced. In lieu of the diester disclosed above a mixed ester in which the half alkyl, aryl or aralkyl ester such as methyl acid phthalate is first prepared in the usual manner, after which the half ester is converted into the acid chloride of the half ester. The latter is condensed with a mol equivalent of methyl salicylate or other aryl, aralkyl or alkyl hydroxybenzoate as in the previous example. The compounds contemplated herein possess properties which render them valuable in the manufacture of resins for use in the lacquer, varnish and molding composition arts and in addition possess the valuable therapeutic properties of hydroxybenzoates.

From the foregoing description it will be apparent that the present invention affords a novel class of organic compositions characterized in that they are phthaloyl (or other dicarboxylic acid) esters containing at least one ester of a hydroxybenzoic acid. It will likewise be apparent that although the invention is directed primarily toward alkyl salicylate esters of dicarboxylic acids above identified and that to this end various alkyl groups may be employed, the invention contemplates not only the ortho hydroxybenzoate (salicylates) but also the meta and para configurations and their derivatives.

What I claim is:

1. As a composition of matter, a neutral ester of an acid selected from a group consisting of phthalic, maleic, succinic, adipic and chlorphthalic, characterized in that at least one of the carboxyl groups is joined to an ester of a hydroxybenzoic acid.

2. A composition of matter, a mixed phthaloyl ester containing one salicylate ester.

3. A mixed phthaloyl ester containing one hydroxybenzoic ester.

4. An ester of phthalic acid and methyl salicylate having the following structural formula:

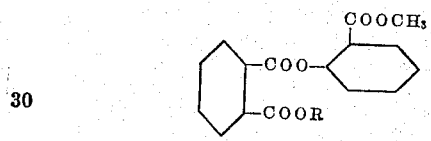

in which R is alkyl or aryl.

5. A neutral phthaloyl hydroxy benzoic acid ester.

6. A material having the formula:

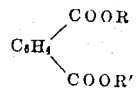

where R and R' are alkyl esters of a salicylic acid residue.

7. A neutral ester having the formula:

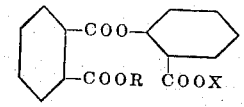

where X is an alkyl group having from 2 to 5 carbon atoms and R is a radical selected from a group consisting of a phenyl carboxylic acid ester and an alkyl group having from 2 to 5 carbon atoms.

LUCAS P. KYRIDES.